United States Patent
Harris et al.

(10) Patent No.: US 6,834,589 B2
(45) Date of Patent: *Dec. 28, 2004

(54) METHODS OF FLEXOGRAPHIC PRINTING WITH INKS EXHIBITING EXPANDED COLOR-SPACE CHARACTERISTICS

(75) Inventors: Philip G. Harris, Spartanburg, SC (US); Patrick D. Moore, Pacolet, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/425,589

(22) Filed: Apr. 29, 2003

(65) Prior Publication Data

US 2003/0200887 A1 Oct. 30, 2003

Related U.S. Application Data

(62) Division of application No. 09/965,742, filed on Sep. 28, 2001, now Pat. No. 6,610,131.
(60) Provisional application No. 60/236,776, filed on Sep. 29, 2000.

(51) Int. Cl.[7] .............................................. B41F 31/00
(52) U.S. Cl. ....................................... 101/491; 101/483
(58) Field of Search ............................ 101/491, 483, 101/348, 335, 450.1

(56) References Cited

U.S. PATENT DOCUMENTS

| | | | | |
|---|---|---|---|---|
| 2,716,061 A | * | 8/1955 | Lupo, Jr. ................. | 430/274.1 |
| 4,066,585 A | * | 1/1978 | Schepp et al. ............. | 524/279 |
| 4,308,061 A | * | 12/1981 | Iwahashi et al. ......... | 106/31.43 |
| 5,261,953 A | | 11/1993 | Vieira et al. .............. | 106/20 R |
| 5,429,841 A | * | 7/1995 | Batlaw et al. ............. | 427/288 |
| 5,462,834 A | | 10/1995 | Weller, Jr. et al. ......... | 430/176 |
| 5,596,027 A | | 1/1997 | Mead et al. ................ | 523/161 |
| 5,919,838 A | | 7/1999 | Mizobuchi .................. | 523/161 |
| 6,090,193 A | * | 7/2000 | Nigam et al. ............. | 106/31.27 |
| 6,273,984 B1 | * | 8/2001 | Bourdelais et al. .... | 156/244.22 |
| 6,548,571 B1 | * | 4/2003 | Cheng et al. ............... | 523/160 |

* cited by examiner

*Primary Examiner*—Anthony H. Nguyen
(74) *Attorney, Agent, or Firm*—Terry T. Moyer; John E. Vick, Jr.

(57) ABSTRACT

Novel magenta and cyan colorants for utilization within water-based inks are provided which exhibit improved chromatic properties. In particular, such colorants provide magenta or cyan colorations that exhibit increased color space characteristics, high water solubility, excellent compatability with impurities, and correspondingly cost-effectiveness for flexographic printing procedures. The methods of utilizing such colorants within flexographic printing processes are also encompassed within the invention.

10 Claims, 1 Drawing Sheet

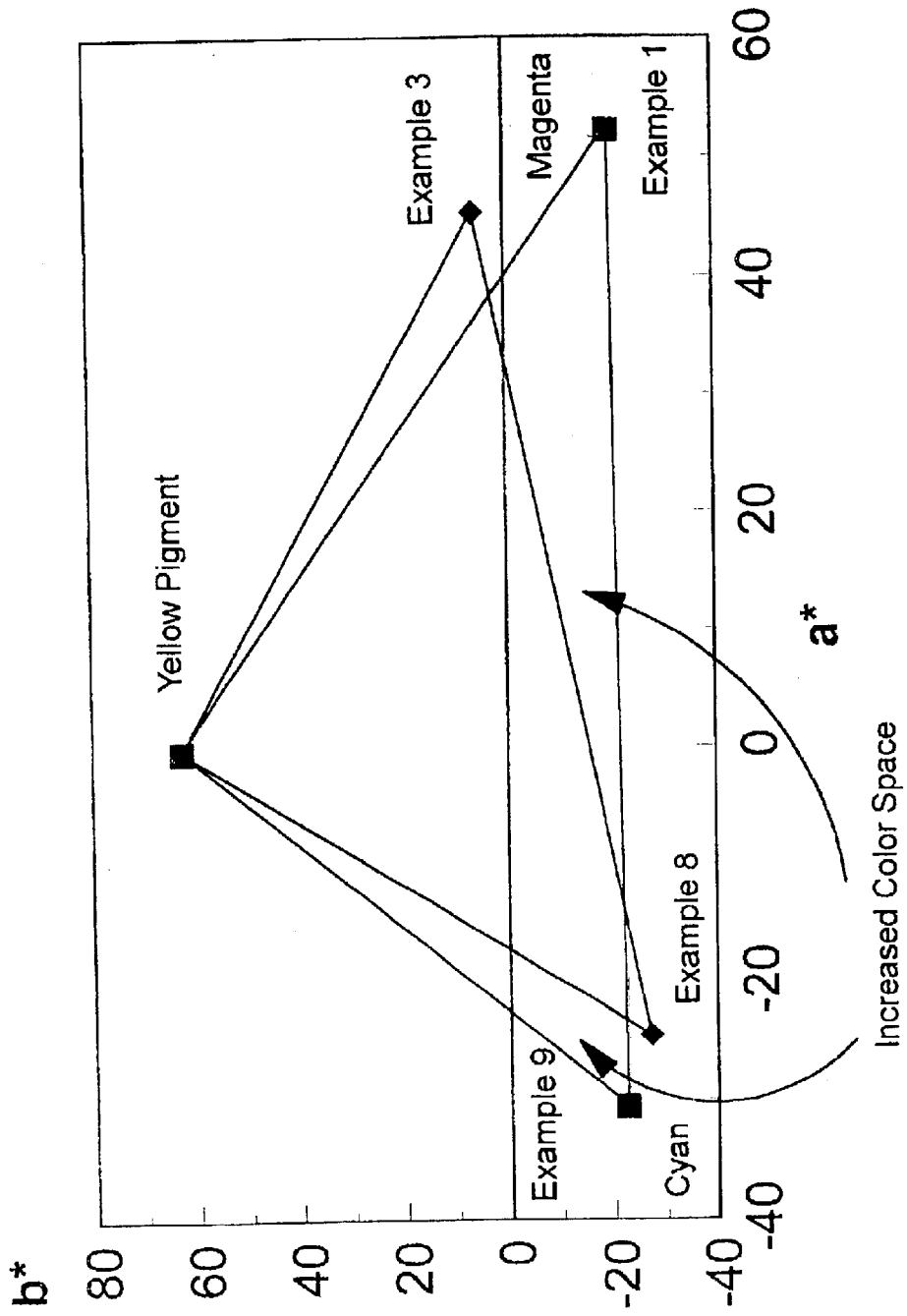

METHODS OF FLEXOGRAPHIC PRINTING WITH INKS EXHIBITING EXPANDED COLOR-SPACE CHARACTERISTICS

CROSS REFERENCE TO RELATED APPLICATIONS

This application is a divisional of U.S. patent application Ser. No. 09/965,742, filed on Sep. 28, 2001 now U.S. Pat. No. 6,610,131, which is based upon provisional application 60/236,776, filed on Sep. 29, 2000.

FIELD OF THE INVENTION

This invention relates to certain colorants for utilization within water-based inks which exhibit improved chromatic properties. In particular, such colorants provide magenta or cyan colorations which exhibit increased color space characteristics, high water solubility, excellent compatibility with impurities, and correspondingly cost-effectiveness for flexographic printing procedures. The methods of utilizing such colorants within flexographic printing processes are also encompassed within the invention.

DISCUSSION OF THE PRIOR ART

Flexographic printing is widely accepted as a versatile overall method of large-scale printing on paper (such as, for example, on and for newspapers and paper advertisements), cardboard, and plastic film substrates. Such a procedure entails the utilization of relief-type printing, including raised rubber, and/or polymeric plates with images present thereon. Such a procedure requires specific inks exhibiting very specific physical characteristics, including, without limitation, aqueous-based and low viscosity, in order to ensure ease in application and omission of organic solvents. Of enormous importance within such a process, the inks utilized must not exhibit appreciable rub-off, and thus must possess a very low drying time after contact and application on the desired paper substrate surface. Such a requirement is rather difficult to accomplish with low viscosity, water-based inks. Examples of such traditional flexographic printing ink colorants may be found at Chapter 2, entitled "Printing Process", and in particular Section 2.2, entitled The Flexographic Process, pages 33–42 and Chapter 9, entitled "Flexographic Inks", pages 547–598 of *The Printing Ink Manual* (Fifth Edition, Edited by R. H. Leach, R. J. Pierce, Published by Blueprint of London, 1993), herein entirely incorporated by reference.

Such standard flexographic ink colors are black, yellow, cyan, and magenta. Although the desired physical properties have been obtained for such standard color inks in the past, there has been an unfortunate lack of corresponding coloring properties available to permit full benefit of such inks as coloring agents for and on the desired printing substrates. For example, the available color space for such traditionally utilized cyan and magenta flexographic inks has been rather limited. Colorability for sample inks and compounds and/or compositions are mathematically defined by measuring the individual components of the equation:

$$E^* = ((L^*)^2 + (a^*)^2 + (b^*)^2)^{1/2}$$

wherein E* represents the total color measurement of the printed sample. $L^*$, $a^*$, and $b^*$ are the color coordinates; wherein $L^*$ is a measure of the lightness and darkness of the print sample; $a^*$ is a measure of the redness or greenness of the print sample; and $b^*$ is a measure of the yellowness or blueness of the print sample. For a further discussion and explanation of this testing procedure, see Billmeyer, F. W., et al., *Principles of Color Technology*, 2nd Edition, pp. 62–64 and 101–04, herein entirely incorporated by reference. For process printing colors, such as magenta and cyan, the desired color characteristics minimize the inclusion of the other process shades. The best example of such a mixture of colorants would be where the individual process shades contained no trace of the other process shades; however, traditional practical colors usually exhibit absorbance characteristics outside of the pure shade range. Nevertheless, it is known within the colorant industry that colorants with specific pure absorbance measurements are necessary to provide better process shades. For instance, for magenta colors, higher redness and blueness is desired, with much lower yellowness and greenness; for cyan, higher blueness and greenness is desired with the others (redness and yellowness) much lower in content and degree. These measurements ultimately determine the effectiveness of a colorant, primarily for aesthetic purposes. Furthermore, it is of great importance, in relation to these measurements, that the target colorant exhibits a specific $\lambda_{max}$ value in order to determine the proper color itself. For magenta, a range of such values is between 525 and 545 nm; however, the ultimate value for such a color is about 534 nm (of course, the measured $a^*$ and $b^*$ of such colors determine the absorbance characteristics as well; thus, attaining certain corresponding levels of such measurements is thus instrumental in obtaining such specific magenta or, as noted below, cyan colorants). To date, such a specific $\lambda_{max}$ for a magenta colorant has not been attained, particularly for utilization within water-based flexographic inks. The best performing colorant is a rhodamine pigment exhibiting CIELAB values as follows at a density necessary for contact and retention on a printing substrate (cellulosic-based paper, for example) at about 0.96: $L^*$=52.25, $a^*$=51.60, and $b^*$=−4.48. Although these measurements are acceptable for certain coloring processes, again, magenta colorants for water-based flexographic printing require even better absorbance characteristics to provide effective shades and hues (the hue error is relatively high for such a pigment, about 44.9, and the grayness is relatively high as well at about 16.8). Thus, improvements are still necessary to accord the desired magenta water-based flexographic colorants needed for effective and aestheticially pleasing print colorations. Again, the attainment of such a specific colorant would provide excellent bright colors and effective mixtures with other colorants for the purposes of providing different hues and shades on the target printing surface.

The same necessity holds true for the ultimate target for cyan color exhibiting a $\lambda_{max}$ of about 629 nm (however, again, the $a^*$ and $b^*$ values for such a colorant actually determines the desired absorbance characteristics). In effect, such theoretical colorants as discussed above must also exhibit low hue errors and low grayness values as well. With such a colorant, the effective color space would expand to such a degree that the resultant colorant would prove to be extremely versatile, particularly as a color constituent in a combination of different colorants.

Furthermore, blends of colorants, either in terms of within actual compositions to be applied to printing surfaces or as overprints on such surfaces, also exhibit certain a* and b* values that are unique and determine the effectiveness of such blends in terms of colorations, brightness, and overall empirical appearance. As such, blends of colorants in terms of magenta and cyan constituents (and thus able to provide different hues shades such as violet, red, and blue, and other shades therefrom) should also exhibit sufficient and/or acceptable CIELAB values (again, a* and b* measurements) that provide the desired levels of aesthetic qualities. To date, the lack of effective magenta and cyan colorants exhibiting such necessary a* and b* values has in turn prevented such needed blends as well.

The diagrams of FIG. 1 (individual color space measurements for certain traditional and inventive cyan and magenta colorants) show how traditional colorants are limited in their available coloring properties. The areas of color space presented with these diagrams indicate the limitations of such traditional colorants, particularly due to resultant high hue error and grayness characteristics. Such characteristics are problematic for flexographic printing in particular when mixing with other colors is necessary to provide a full complement of different hues and shades for and on the desired print substrate. A high hue error may present difficulty in producing desired colors requiring the cyan and/or magenta component (such as violet, red, blue, green, and the like). Grayness affects the shade and appearance, and if such a characteristic is too high, dullness, and the like, will be prevalent, particularly when such colorants are utilized in combination with others (in actuality, grayness is similar in effect to adding a black constituent within a color combination). As a result, or, in correlation with such coloring characteristics, the attainment of such low individual chromatic characteristics provides a colorant with increased color space properties as well. Generally, flexographic printing standards include target measurements for such colorants, including magenta hue errors with a range of 58 to 63 and a grayness average of 15 with a range of 13 to 17, and ink density measurements of about 0.97. For cyan colorants, these measurements are targeted for 33 degrees of hue error, preferably a range of from 31 to 35, grayness of 15 with a range of 13 to 17, and an ink density of about 0.95. Thus, the best colorants available today exhibit such high measurements. However, there is a perceived need to lower such hue error and grayness properties while retaining, at least, the same general density characteristics. Upon such a decrease in hue error and grayness measurements, the area within the "triangle" depicted in FIG. 1 will expand to provide a colorant of greater versatility than those typically utilized today. Thus, there is a great need to provide magenta and cyan water-based colorants, particularly suited for flexographic printing, which exhibit highly desired, but previously unattainable, low grayness and low hue error characteristics. Again, to date, there have been no such specific types of water-based colorants taught or fairly suggested within the pertinent prior art and/or utilized within the printing industry.

DESCRIPTION OF THE INVENTION

It is thus an object of this invention to provide an improved water-based ink composition comprising at least one of a magenta or cyan colorant (including dyestuffs, dyes, pigments, and the like) which exhibits the aforementioned highly desirable low grayness and hue error characteristics. Another object of this invention is to provide a magenta or cyan colorant which exhibits an average hue error reduction of at least 2° as compared with the standard water-based magenta or cyan colorants utilized today. Yet another object of this invention is to provide a water-based magenta or cyan colorant which, when mixed with other standard water-based colorants, provides a bright, effective resultant colorant for utilization within flexographic printing processes. It is important to note that all chromatic properties for the traditional (and thus comparison) colorants and inks thereof, as well as the inventive colorants and inks thereof and based upon the actual printed samples of such formulations. Only after printing can such an assessment of color space, grayness, hue error, etc., be analyzed and measured.

Accordingly, this invention concerns a magenta colorant (exhibiting chromatic properties of, for example, lambda maximum of about 543 nm), that, when incorporated within a water-based ink and applied to paper at a density of from about 0.95 to about 1.05, the print exhibits CIELAB values of an a* of at least 52 and a b* of at most 0; or an a* of at least 45 and a b* of at most −4.6 (each having an L* value of about 54 or higher, a hue error of at most 40, preferably at most 35, more preferably at most about 30, and most preferably at most about 25, and a grayness measurement of at most 15, preferably at most about 14, more preferably at most 13.75, and most preferably at most about 13.5). Preferably, such a magenta colorant exhibits an a* of at least 52 and a b* of at most −4.6, with particularly preferred values of an a* of at least 52.2 and a b* of at most −19.8. A lithol rubine comparison ink at the same density and L about 61.02, the print has an a* of 45.31, b* of 5.98, hue error of 63.0 and grayness of 20.0, and the closest magenta colorant known within the art, the rhodamine pigment discussed above cannot match these requirements attained within by the inventive colorants. This invention thus also concerns the improvement in shade between the expanded color space for the inventive magenta colorant and such comparative standard lithol rubine and rhodamine pigments (as the closest known examples).

This invention also concerns a cyan colorant (exhibiting chromatic properties of, for example, lambda maximum of about 629 nm), that, when incorporated within a water-based ink and applied to paper at a density of from about 0.95 to about 1.05, the print exhibits CIELAB values of an a* of at most −26 and a b* of at most −27; or an a* of at most −27 and a b* of at least −25 (each having an L* value of about 54 or higher, a hue error of at most 30, preferably at most 28, more preferably at most about 26, and most preferably at most about 24, and a grayness measurement of at most 15, preferably at most about 14.5, more preferably at most 14, and most preferably at most about 13.75). Preferably, such a cyan colorant exhibits an a* of at most −28.27 and a b* of at least −22.12. For a copper phthalocyanine comparison ink (the closest known comparative example) at the same density and L about 55.52, the print has an a* of about −24.53, b* of about −27.15, hue error of 32.5 and a grayness of 15.0. This invention therefore concerns the improvement in shade between the expanded color space for the inventive cyan colorant and such a standard colorant as the aforementioned copper phthalocyanine pigment as well. Furthermore, this invention concerns a water-based ink comprising the aforementioned inventive colorants, either as the sole colorants presents or in conjunction with other known or inventive colorants, pigments, dyes, dyestuffs, and the like. Additionally, such an invention concerns blends of colorants that, when printed on a substrate at a density of between 0.95 and 1.05 exhibits CIELAB values of an a* of at least 47 and a b* of at most 0, or an a* of at least 45 and a b* of at most −0.5 (for magenta-containing blends). Alternatively, for cyan-containing blends, such an invention concerns blends of colorants that, when printed on a substrate at a density of between 0.95 and 1.05 exhibits CIELAB values of an a* of at most −25 and a b* of at least −24. Also, this invention concerns a method of flexographic printing comprising the utilization of any of the aforementioned colorant and/or inks and colored printed substrates exhibiting such CIELAB values as noted above in the areas to which the desired colorations have been applied.

Such colorants as noted above (and thus as components within the aforementioned blends) include any compound selected from the group consisting of at least polymeric colorant, at least one dyestuff, at least one dye, at least one pigment, and any mixtures thereof. In particular, the inventive colorant must include at least one colorant exhibiting increased color space characteristics in relation to those of the best known traditional colorants of the same type. Preferably, but not necessarily, such colorants are of the cyan or magenta type. As merely examples of proper selections as chromophoric groups within the inventive colorants, non-limiting examples include, for magenta colorants, rhodamines, on dyes and polymeric colorants, and the like, and for cyan, Acid Blue 9, blue polymeric colorants (such as those available from Milliken & Company, and the like). As noted above, overprinting blends of such colorants and other components are within the scope of this invention as long as at least one component of such an overprint is an inventive colorant as defined and discussed herein.

Typically, such colorants are generally not present and/or utilized in water-based formulations alone but are combined with a resin (such as Joncryl® 60, manufactured by S.C Johnson & Son), in order to provide water-solubility characteristics. In addition, it has been found that the addition of a sterically hindered adduct (such as, as one example, dimethylethanolamine, and the like) to polymeric colorants and dyestuffs provides protection to the chromophore itself such that reaction with bases, etc., present within the ultimate ink composition cannot readily take place within the color-based formulations. As a result, it has been found that the inventive colorant is not susceptible to such basic attack and thus exhibits the desired chromatic properties as discussed above. Additionally, the presence of such a sterically hindered adduct (such as di-$C_1$–$C_{10}$-alkyl-$C_2$–$C_4$-alkanolamines) on the inventive colorant does not affect the solubility such that the water soluble nature of the resin-reacted colorant is retained at its desirable level. The viscosity of the colorant, when in aqueous solution, is also not affected upon the presence of such an adduct. The color provided, as noted above, is excellent, particularly concerning the aforementioned hue error, grayness, and ultimately, color space properties. Furthermore, the presence of such a hindered amine adduct provides a greater resistance to any impurities present within the aqueous ink composition. For instance, as noted above, any basic compounds or solvents will not deleteriously affect the colorant when the adduct is present. Other impurities, such as biocides, defoamers, and the like, will not readily react or affect the same colorant to any appreciable degree either. Such a resistance to impurities actually appears to provide the desired chromatic properties in comparison with the traditional colorants discussed above. As a result of all of these characteristics, the inventive colorants are extremely stable when utilized within a variety of different ink compositions, and, particularly, when mixed with other colorant compositions to provide different shades and colors to the user. Lastly, the density provided by such inventive colorants is roughly the same as those targeted for utilization within flexographic printing processes.

Particularly desired as optional additives are, as discussed above, water solution or emulsion resins which are present to adjust the viscosity of and to increase the film strength of the ultimate ink formulations. Such resins include, without limitation, acrylics, acrylic latexes, proteins, and urethanes. Of limited use due to their low degree of water solubility, but feasible as resins for this composition, are carboxylated acrylics, polyvinyl alcohol, hydroxyethyl cellulose, and polyvinyl pyrrolidone. These resins are preferably acrylic in nature and comprise from 0 to about 40% of the entire ink composition. Particularly preferred acrylic resins are acrylic solution resins, such as Joncryl® 60, manufactured by S.C. Johnson & Son, Inc., Morcryl® 132 and 150, manufactured by Morton International, Inc.; acrylic emulsion resins, such as Joncryl® 537, 540, 1954, SCX-2153, and SCX-2155, manufactured by S.C. Johnson & Son, Inc.; styrenated acrylic emulsion resins, such as Joncryl® 89 and 130, manufactured by S.C. Johnson & Son, Inc., Lucidene® 602, manufactured by Morton International, Inc., and Zinpol® 460, manufactured by B.F. Goodrich; acrylic colloid emulsion resins, such as Joncryl® 142 and SCX-646, manufactured by S.C. Johnson & Son, Inc.; acrylic copolymer emulsion resins, such as NeoCryl® XA-590 and B-817, manufactured by ICI Resins; and polyester-styrene acrylic resins, such as Lucidene® 1500, manufactured by Morton International, Inc. The most preferred acrylic resin is Joncryl® 130, a styrenated acrylic emulsion manufactured by S.C. Johnson & Son, Inc., which increases water fastness. These resins are generally neutralized with ammonia to increase their aqueous solubility. Also with regard to the potential resin constituents of the inventive compositions are those which have a low viscosity to provide the most effective depth of color on the printing substrate. Preferably, the resin is present in an amount sufficient to provide an ink composition having a viscosity, as tested using a #2 Shell Cup, ranging from about 10 to about 26 seconds, and most preferably from about 22 seconds (as a comparison, water itself exhibits a viscosity of about 8.9 sec under this test). This amount generally comprises from about 5 to about 40 wt % of the total ink composition. Also of great importance to this inventive composition is the utilization of softened or deionized water to dilute the thick liquid colorant before formulating an ink composition. Hard or tap water may contain calcium or other metal ions which may complex with the aforementioned resins, effectively increasing the overall viscosity of the composition.

The inventive colorants thus permit utilization of such colorants alone within water-based inks as well as combinations of such high color space colorants combined within inks compositions. Furthermore, and of greater importance, is the realization that such high color space inventive magenta and cyan colorants may be mixed with other types of lower color space colorants (pigments, and the like) in order to provide brighter colorations of desired hues and shades.

DESCRIPTION OF THE PREFERRED EMBODIMENT

The preferred non-limiting methods of making the preferred inventive colorants is as follows:

EXAMPLE 1

(Inventive Magenta Dye)

An ink composition was produced through the admixture of about 20.8 parts of water with a colorant of about 4.1 parts of a rhodamine B dye (available from Aldrich [CAS 81-88-9], dye content of about 80%) reacted with about 0.9 parts of dimethyl ethanolamine (DMEA). The resultant slurry was mixed until the dye dissolved within the aqueous solution giving a dark red clear liquid with a pH of about 8.45.

To about 4.9 parts of this resultant clear red liquid, 5.3 parts of Joncryl® 60 acrylic solution resin, 2.4 parts of water, and 1.5 parts of DMEA in order to produce a liquid exhibiting a viscosity of 22 seconds as measured with a #2 shell cup at a pH of about 9.5. The red ink was then drawn down on a newspaper substrate with a hand proofer to give a 0.98 density (print plus the paper). The $\lambda_{max}$ of the inventive colorant was also measured to be about 534 nm.

EXAMPLE 2
(Inventive Magenta Polymeric Colorant)

An ink composition was produced through the admixture of about 37.8 parts of water with 48.7 parts of a polymeric colorant (LiquiTone® Magenta 418 available from Milliken & Company), 12.2 parts of Joncryl® 130 acrylic emulsion, and 1.3 parts of (DMEA) in order to produce a liquid exhibiting a viscosity of 22 seconds as measured with a #2 shell cup at a pH of about 9.5. The resultant polymeric colorant ink was then drawn down on a newspaper substrate with a hand proofer to give a 1.0 density (print plus paper).

EXAMPLE 3
(Comparative)

An ink composition was produced through the dispersion of 50.0 parts of Acroverse® 32R80D lithol rubine pigment (available from Penn Color), 15.5 parts of water, and 34.5 Joncryl® 60 acrylic emulsion in order to produce a liquid exhibiting a viscosity of 22 seconds as measured with a #2 shell cup at a pH of about 9.5. The resultant red pigment ink was drawn down on newspaper with a band proofer to give a density of 1.0 (print plus paper).

EXAMPLE 4
(Inventive Combination of Dye with Pigment)

An ink was produced through the admixture of 5.8 parts of the ink of EXAMPLE 1 and 6.1 parts of the ink of Comparative EXAMPLE 3. The resultant red ink mixture was drawn down on newspaper with a hand proofer to give a density of 1.0 (print plus paper).

EXAMPLE 5
(Inventive Combination of Polymeric Colorant with Pigment)

An ink was produced through the admixture of 32.8 parts of water, 24.3 parts of Magenta 418 polymeric colorant, 21.1 parts of lithol rubine pigment dispersion (such as from EXAMPLE 3, above), 21.2 parts of Joncryl® 130 acrylic emulsion, and 0.6 parts of (DMEA) in order to produce a liquid exhibiting a viscosity of 22 seconds as measured with a #2 shell cup at a pH of about 9.5. The resultant polymeric colorant ink was then drawn down on a newspaper substrate with a hand proofer to give a 1.0 density (print plus paper).

EXAMPLE 6
(Inventive Cyan Dye with Blue Pigment)

An ink was made by mixing 17.8 parts of the acid blue 9 (inventive) ink of EXAMPLE 9 below and 82.2 parts of the copper phthalocyanine ink also described below in EXAMPLE 8. The blue dye and pigment ink mixture was drawn down on newsprint with a hand proofer to give 0.99 density T (print plus paper).

EXAMPLE 7
(Inventive Cyan Polymeric Colorant with Blue Pigment)

An ink was made by mixing together 36.1 parts of water, 11.2 parts of Blue 892 (Milliken polymeric colorant; see EXAMPLE 10 below for the inventive polymeric colorant alone), 21.1 parts of copper phthalocyanine pigment disperison (Penn Color Acroverse® 32S34D), and 31.6 parts of Joncryl® 60 acrylic emulsion resin to give a viscosity of 22 seconds as measured with a #2 Shell. The polymeric colorant ink was drawn down on newprint with a hand proofer to give a 1.0 density T (print plus paper).

EXAMPLE 8
(Comparative Blue Pigment Alone)

A comparative ink was made by dispersing 30.2 parts of Acroverse® 32S34D copper phthalocyanine pigment dispersion (manufactured by Penn Color Inc, Doylestown, Pa.), 30.6 parts of water, 39.2 parts of Joncryl® 60 acrylic solution resin to give a viscosity of 22 seconds as measured with a #2 Shell cup. The blue pigment ink was drawn down on newsprint with a hand proofer to give 1.0 density T (print plus paper).

EXAMPLE 9
(Inventive Cyan Dye)

An ink was made by mixing together 83.15 parts of water, 14.65 parts of acid blue 9 dye (Aldrich [CAS 2650-18-2]), and 2.20 parts of dimethyl ethanolamine (DMEA). The slurry was mixed until the dye dissolved, giving a dark blue clear liquid with a pH of 8.5.

To 67.5 parts of the above acid blue 9 solution was added 22.4 parts of Joncryl® 60 acrylic solution resin, and 10.1 parts water to give a viscosity of 22 seconds as measured with a #2 Shell cup. The blue ink was drawn down on newsprint with a hand proofer to give 0.99 density T (print plus paper).

EXAMPLE 10
(Inventive Cyan Polymeric Colorant)

An ink was made by mixing together 48.8 parts of water, 37.4 parts of Blue 892 (Milliken polymeric colorant), and 13.8 parts of Joncryl 130 acrylic emulsion resin to give a viscosity of 22 seconds as measured with a #2 Shell. The polymeric colorant ink was drawn down on newprint with a hand proofer to give a 0.99 density T (print plus paper).

EXAMPLE 11
(Comparative Blend of Rhodamine Pigment and Lithol Rubine Pigment)

An ink was produced through the admixture of even parts of the ink of EXAMPLE 3 and a rhodamine pigment. The resultant red ink mixture was drawn down on newspaper with a hand proofer to give a density of 0.97 (print plus paper).

Analysis of the Resultant Compositions

All of the ink samples were tested for their colorability by measuring the individual components of the equation:

$$E^* = ((L^*)^2 + (a^*)^2 + (b^*)^2)^{1/2}$$

again wherein E* represents the total color measurement of the printed sample. $L^*$, $a^*$, and $b^*$ are the color coordinates; wherein $L^*$ is a measure of the lightness and darkness of the print sample; $a^*$ is a measure of the redness or greenness of the print sample; and $b^*$ is a measure of the yellowness or blueness of the print sample. Such measurements were taken of the printed colorants on the print surface with an X-Rite Model 938 spectrodensitometer. The results for the EXAMPLES 1–10 are presented in tabulated form below:

TABLE

| Sample | L | a* | b* | Hue Error | Grayness |
| --- | --- | --- | --- | --- | --- |
| EXAMPLE 1 | 54.00 | 52.20 | −19.80 | 21.6 | 13.5 |
| EXAMPLE 2 | 53.45 | 52.80 | −17.28 | 24.2 | 13.9 |
| EXAMPLE 3@ | 61.02 | 45.31 | 5.98 | 63.0 | 20.0 |
| EXAMPLE 4 | 51.02 | 48.31 | −0.98 | 50.0 | 17.8 |
| EXAMPLE 5 | 52.63 | 48.73 | −2.18 | 49.0 | 17.3 |
| EXAMPLE 6 | 56.92 | −26.95 | −24.94 | 29.1 | 14.7 |

TABLE-continued

| Sample | L | a* | b* | Hue Error | Grayness |
|---|---|---|---|---|---|
| EXAMPLE 7 | 56.46 | −26.91 | −25.14 | 29.2 | 15.1 |
| EXAMPLE 8@ | 55.52 | −24.53 | −27.15 | 32.5 | 15.0 |
| EXAMPLE 9 | 59.93 | −30.54 | −22.45 | 20.6 | 13.9 |
| EXAMPLE 10 | 59.29 | −28.27 | −22.12 | 23.4 | 13.7 |
| EXAMPLE 11@ | 51.85 | 45.89 | 3.07 | 57.9 | 19.7 |

@= Comparative Pigments or blends

Thus, the Inventive Colorants and compositions containing such colorants exhibited far superior hue error and grayness measurements than the traditional pigments utilized within water-based inks. As a result, such Inventive colorants, etc., are far superior in providing bright, effective colorations within flexographic printing methods, particularly in combination with other non-Inventive colorants to provide distinctive, desirable hues and shades. Furthermore, the a* and b* values for these inventive colorants evince the necessary and desired increased in color space in comparison with the two comparative pigments.

The colorants and blends of EXAMPLEs 1, 4, 6, and 9 were then flexographically applied to paper substrates to simulate newsprint. The colorations were excellent and bright.

BRIEF DESCRIPTION OF THE DRAWING

As discussed above, FIG. 1 depicts the color space characteristics in graphical form of certain colorants as they have been drawn down on a newsprint surface.

DETAILED DESCRIPTION OF THE DRAWING

The diagrams within FIG. 1 show the limited color space characteristics of the standard colorants now utilized (pigments, for example) in comparison with the colorants determined to provide more effective, brighter colorations for water-based ink processes. Such an increase in the specific coloring characteristics of the colorants of EXAMPLEs 1, 9, and 10, at least, evince the movement of such characteristics in the desired direction (i.e., to more blueness for cyan, to greater redness for magenta, as examples) in relation to the limited characteristics of the traditional colorants. As such, it is evident that the inventive colorants, when printed on specific substrates, provide highly desirable improved color space, hue error, grayness, etc., properties than those of the prior art pigments now utilized extensively for water-based flexographic printing methods.

There are, of course, many alternative embodiments and modifications of the present invention which are intended to be included within the spirit and scope of this application.

We claim:

1. A method of flexographic printing of a substrate comprising the steps of
   (a) providing a water-based ink comprising at least one water-soluble magenta colorant, selected from the group consisting of a Basic Violet 10 dye and a polymeric colorant, including a sterically hindered adduct reacted therewith;
   (b) providing a print substrate; and
   (c) flexographically applying said water-based ink to said print substrate wherein said magenta colorant is present at a density of about 0.95 to about 1.05 and wherein in the applied state the water-based ink composition exhibits CIELAB values of an a* of at least 52 and a b* of at most 0.

2. A method of flexographic printing of a substrate comprising the steps of
   (a) providing a water-based, organic, solvent free ink comprising at least one water-soluble cyan colorant, selected from the group consisting of an Acid Blue 9 dye and a polymeric colorant, including a sterically hindered adduct reacted therewith;
   (b) providing a print substrate; and
   (c) flexographically applying said water-based ink to said print substrate wherein said cyan colorant is present at a density of about 0.95 to about 1.05 and wherein in the applied state the water-based, organic, solvent free ink composition exhibits CIELAB values of an a* of at most −27 and a b* of at least −25.

3. The invention as recited in claim 1, wherein in the applied state the colorant exhibits a hue error of at most 40 and a grayness of at most 15.

4. The invention as recited in claim 3, wherein in the applied state the colorant exhibits a hue error of at most 35 and a grayness of at most 14.

5. The invention as recited in claim 4, wherein in the applied state the colorant exhibits a hue error of at most 30 and a grayness of at most 13.75.

6. The invention as recited in claim 5, wherein in the applied state the colorant exhibits a hue error of at most 25 and a grayness of at most 13.5.

7. The invention as recited in claim 2, wherein in the applied state the colorant exhibits a hue error of at most 30 and a grayness of at most 15.

8. The invention as recited in claim 3, wherein in the applied state the colorant exhibits a hue error of at most 28 and a grayness of at most 14.5.

9. The invention as recited in claim 8, wherein in the applied state the colorant exhibits a hue error of at most 26 and a grayness of at most 14.

10. The invention as recited in claim 9, wherein in the applied state the colorant exhibits a hue error of at most 24 and a grayness of at most 13.75.

* * * * *